Sept. 6, 1966  F. R. JAECKEL  3,271,227
APPARATUS FOR DISPENSING AND APPLYING PRESSURE SENSITIVE LABELS
Filed May 9, 1963  3 Sheets-Sheet 1
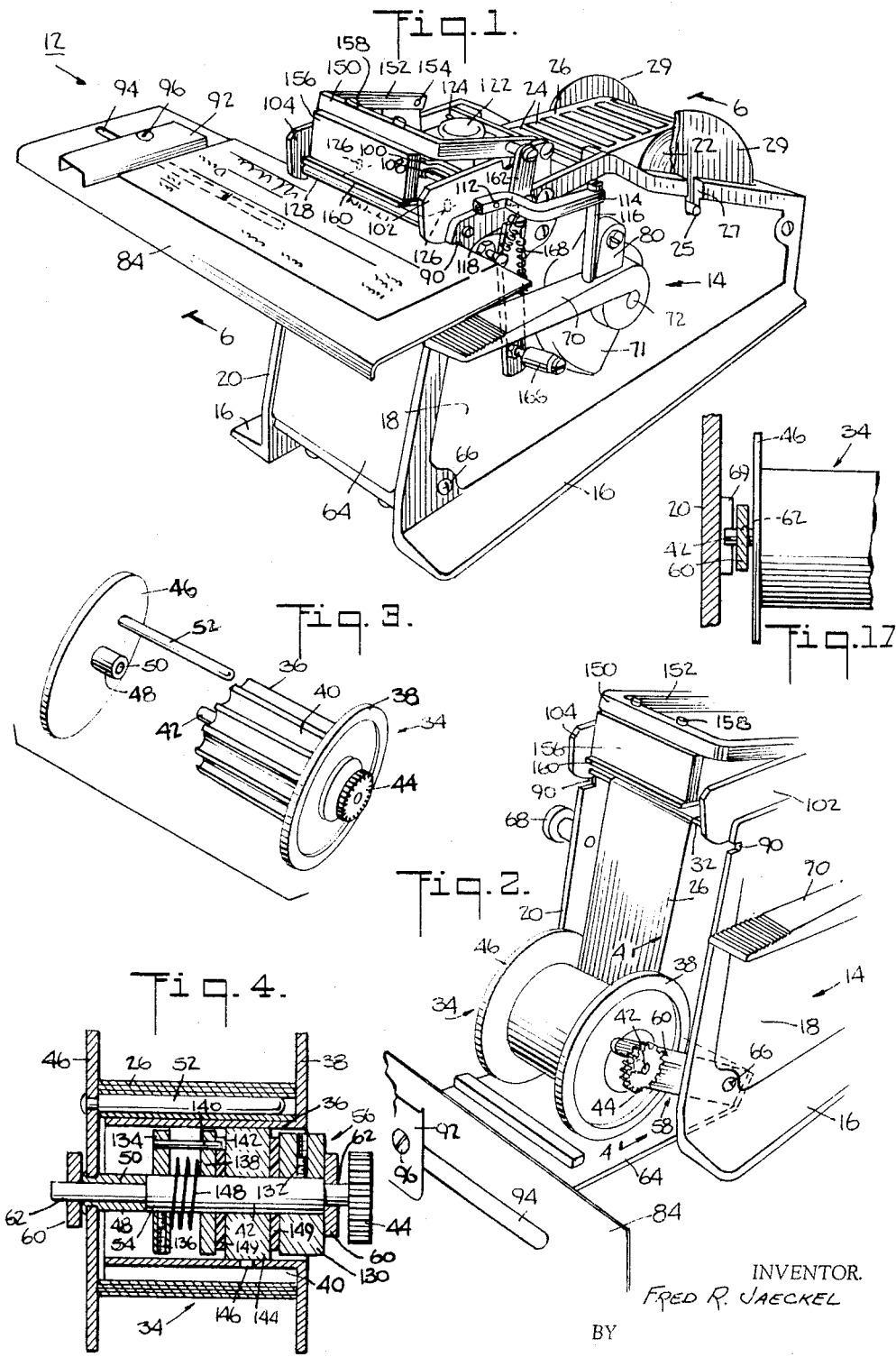
INVENTOR.
FRED R. JAECKEL
BY
Kitschstein, Kitschstein & Ottinger
ATTORNEYS

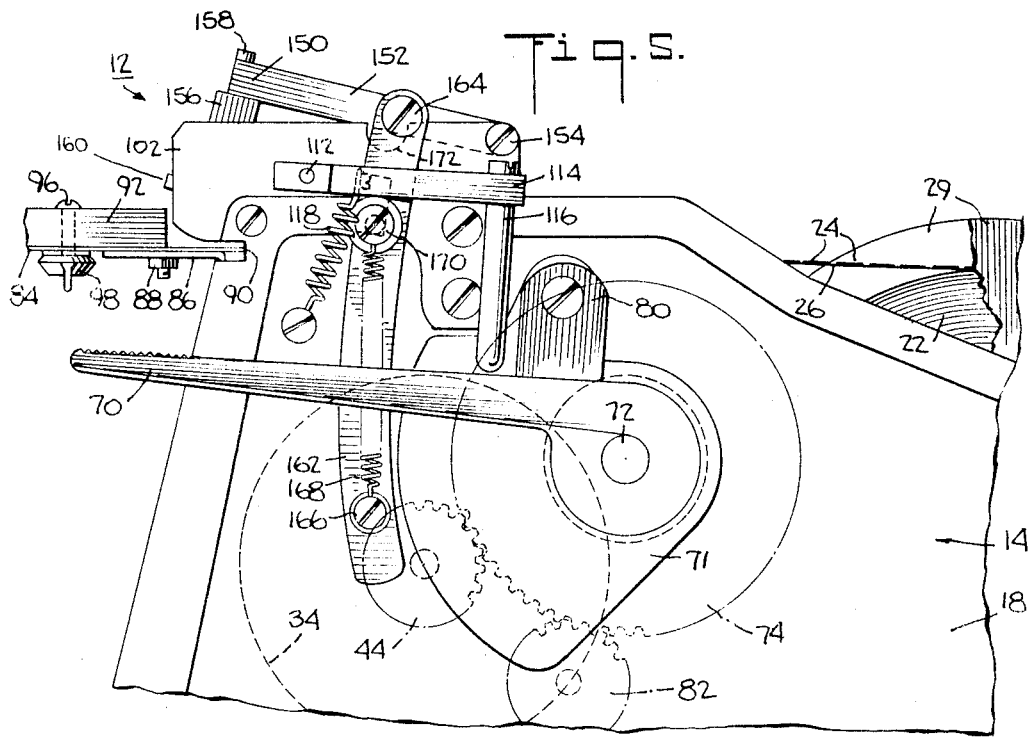
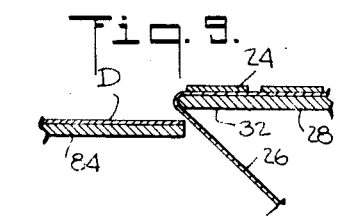
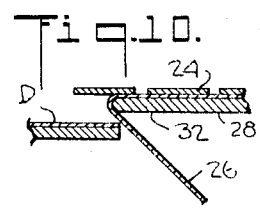
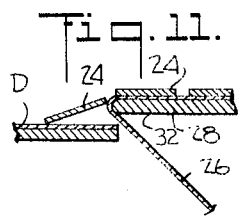
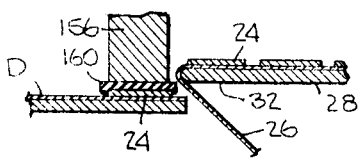
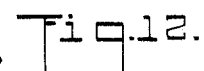
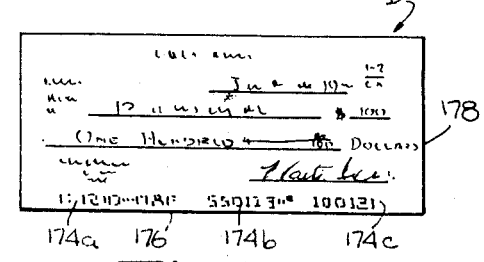
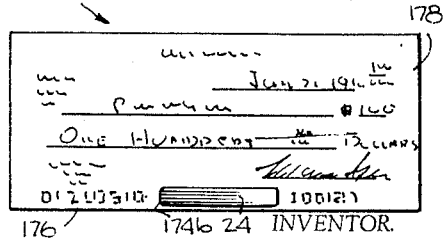

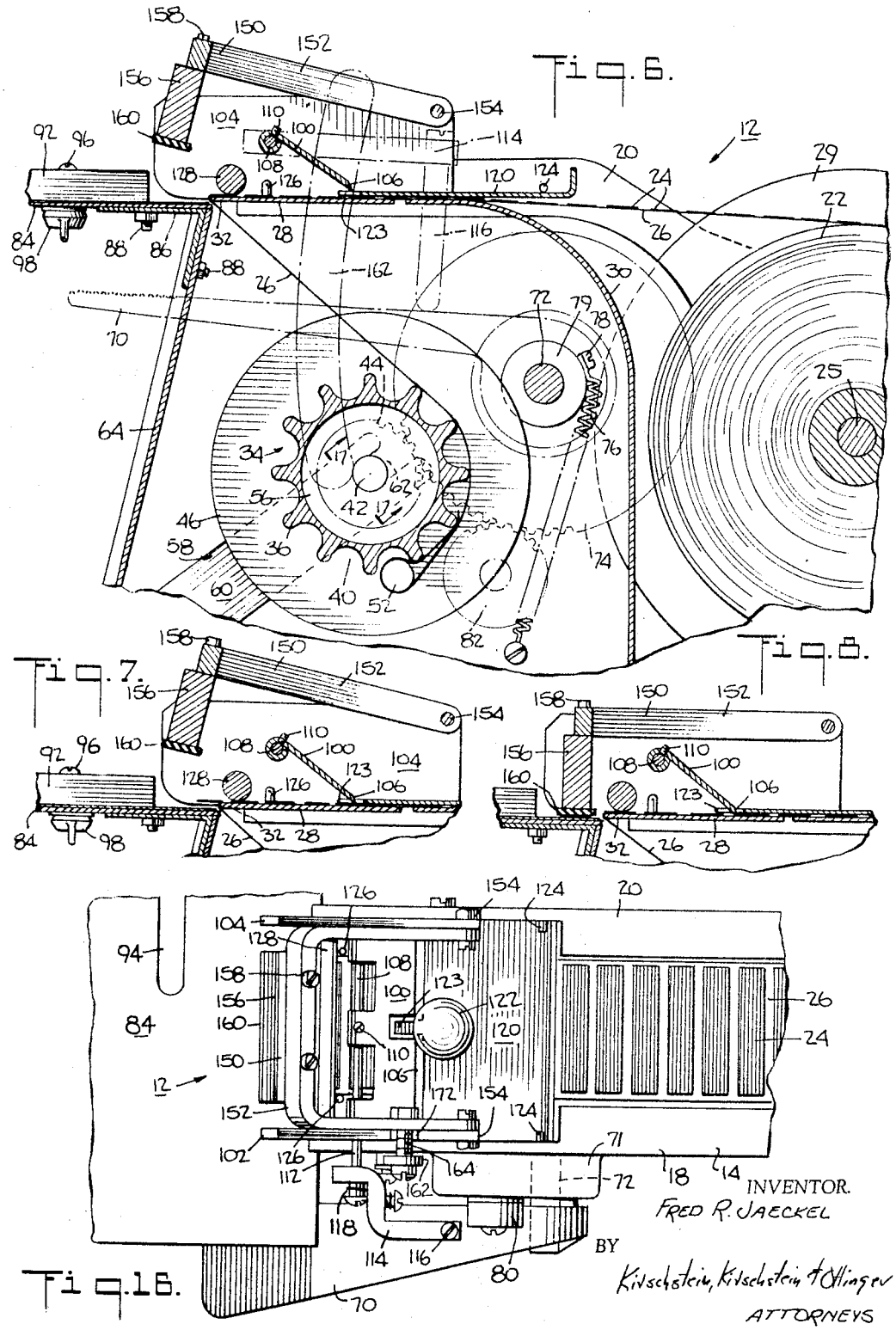

United States Patent Office 3,271,227
Patented Sept. 6, 1966

3,271,227
APPARATUS FOR DISPENSING AND APPLYING
PRESSURE SENSITIVE LABELS
Fred R. Jaeckel, Jamaica, N.Y., assignor to Normandie
Press, Inc., New York, N.Y., a corporation of New
York
Filed May 9, 1963, Ser. No. 279,143
11 Claims. (Cl. 156—556)

This invention relates to an apparatus for dispensing and applying pressure sensitive labels to documents and the like.

It is an object of this invention to provide an apparatus for quickly and efficiently dispensing pressure sensitive labels from a backing strip and applying the labels to any selected one of several predetermined locations on a document.

Automated accounting systems frequently utilize magnetic ink characters imprinted on an original source document to enable that document to be a carrier of its own identifying data. Magnetic Ink Character Recognition (MICR) systems of this type are used to effect bank automation by imprinting on bank deposit slips and checks MICR characters to identify and encode pertinent data on such a document. For example, the MICR characters may encode a bank identification number, a customer identification number, and the face value of a check. Some of this data may be prequalified, i.e., the bank's identification number and the customer's identification number can be imprinted with the magnetic characters when the checks or deposit slips are ordered from the printer. Other data, e.g. the amount of an individual check, are encoded by the bank when the check is received.

In order to maintain the integrity of each group of magnetic characters so that an automated accounting machine can properly scan and retrieve pertinent data from an encoded document, it is evident that each group of magnetic characters must be imprinted in a predetermined location on the surface of the document, according to the category in which the characters give information. Thus, for a specific accounting system, data of a certain class, e.g. bank identification, will always appear in the same location on a check.

The encoding of the magnetic characters onto the data bearing document inevitably causes incorrect data or characters to be imprinted on these checks upon occasion due to human error. The printer may imprint a wrong character on a group of checks; a customer may somehow use another person's encoded check; or a clerk may imprint the wrong amount in magnetic characters on the check.

In order to correct these mistakes in the quickest manner while maintaining a neat appearance on the encoded document, pressure sensitive labels are applied over the group of characters in which there is an erroneous imprint, and then new magnetic ink characters are encoded onto this label. The labels are of sufficient density (magnetic impermeability) to prevent a magnetic ink reading device from sensing the erroneous group, i.e., the characters under the correction label, and the labels are at least the size of the surface area utilized by a group of characters.

Thus, it is a further object of my invention to provide an apparatus of the character described which will apply a correction label to a document over a group of magnetic characters as used in a MICR system. Such an apparatus must guide pressure sensitive labels peelable from a carrier or backing strip on which they are supplied to a position over a group of magnetic characters in a manner such that the labels can be applied as quickly as an operator can feed the data-bearing documents into the apparatus and operate the apparatus. Since it is desirable to keep the non-pressure sensitive (exposed) surfaces of the labels free of dirt, fingermarks etc. in order that the new magnetic characters can be imprinted clearly and so that the scanning device will encounter no obstructions in the scanning process, the hands of the operator need not touch the correction label in the utilization of my apparatus.

In general, my apparatus includes means for dispensing peeled pressure sensitive labels from a backing strip and means for applying the peeled labels onto a predetermined location on the surface of a document.

Each label is provided with one pressure sensitive adhesive face and the labels are carried seriatim on a backing strip with the adhesive face of the label lightly adherent to the strip. The dispensing means has a supply roll of labels mounted on a rolled up backing strip and a take-up roll upon which the strip is wound after the labels have been dispensed. In its travel between these two rolls, the strip is driven and guided so as to take a sharp reverse bend over a stripping edge. Since the labels only lightly adhere to the strip and are somewhat stiffer than the strip, the labels, rather than follow the path of the strip, are peeled away and thus are dispensed from the strip.

The means for applying the labels to a predetermined location on the document includes accurate guide means so that each label which is dispensed from the strip will be deposited on the same situs. To this end, a blocking member is provided to regulate the advance of the strip so that only one label is applied to a document during a cycle of operation. A shelf is provided to support the document and document positioning means are associated with the shelf so that each label can be deposited in a predetermined location over a group of magnetic characters on the document. A press affixed to my apparatus urges the applied label into firm adhesive contact with the document surface.

The application of the correction label as described is automatically effectuated by my apparatus, the rate of application depending only on the speed with which the operator can place a document into my apparatus and actuate the operating handle thereof. The time consuming process of applying a correction label by hand including aligning such label accurately over the MICR characters is thereby eliminated.

The embodiment of the apparatus presently to be described incorporates all of the above mentioned functions in connection with a label dispenser more fully described in United States Letters Patent No. 3,066,881. It will be obvious, however, that a reader of the instant disclosure skilled in the art will be able to readily adapt this embodiment to other similar label dispensers and that such adaptations lie within the scope of my invention. It thus is understood that the present embodiment is to be regarded as illustrative of my concept.

Other objects of my invention in part will be obvious and in part will be pointed out hereinafter.

My invention accordingly consists in the features of construction, combinations of elements and arrangements of parts which will be exemplified in the apparatus hereinafter described and of which the scope of application will be indicated in the appended claims.

In the accompanying drawings, in which I have shown one of the various possible embodiments of my invention:

FIG. 1 is a three-quartered perspective view of my apparatus;

FIG. 2 is a view similar to FIG. 1 of the forward portion of my apparatus with the front cover in open position;

FIG. 3 is a perspective view of the take-up roll used in my apparatus;

FIG. 4 is a vertical cross-sectional view taken substantially along the line 4—4 of FIG. 2;

FIG. 5 is an enlarged side view of the forward portion of my apparatus;

FIG. 6 is an enlarged side cross-sectional view taken substantially along the line 6—6 of FIG. 1;

FIGS. 7 and 8 are views similar to FIG. 6, but showing two later positions of my apparatus in a cycle of operation;

FIGS. 9–13 are detailed successive views showing the movement of a label from its backing strip onto a stationary document;

FIGS. 14 and 15 are plan views, respectively, of a check before and after application of a pressure sensitive correction label;

FIG. 16 is a top view of the forward portion of my apparatus; and

FIG. 17 is a fragmentary cross-sectional view taken substantially along the line 17—17 of FIG. 6.

Referring now in detail to the drawings, the reference numeral 12 indicates my apparatus for applying pressure sensitive labels to predetermined locations on documents. The apparatus 12 includes means for dispensing such labels.

Said means comprises a heavy supporting structure 14 which has a base 16 and upstanding spaced parallel walls 18, 20 joined to the base. Between the walls 18, 20 is formed a cavity in which at the rear of the device a supply roll 22 of pressure sensitive labels 24 carried on a backing strip 26 is situated. A shaft 2 cradled in wells 27 in the walls 18, 20 supports the roll 22. Two large diameter discs 29 on opposite sides of the roll 22 transversely locate the roll.

By pressure sensitive label is meant a label having one face coated with a tacky adhesive and one non-coated face. The labels 24 are elongated and are carried seriatim on the backing strip 26, each label having its pressure sensitive face adherent to the backing strip. The labels are uniformly spaced along the length of the strip 26 and are oblong with their longitudinal axes transverse to the length of the strip 26. However, for other applications, the labels may be of other desirable shapes. The strip 26 has high release characteristics, e.g. is coated with silicone, so that the labels 24 are readily peelable from the strip.

The strip 26 with labels 24 thereon is drawn through a fixed path from the supply roll 22 over a flat table 28 which is the horizontal portion of a guide plate 30, is then bent sharply reversely and downwardly over a horizontal jutting stripping edge 32 at the front of the table 28 to cause the labels 24 to be peeled away from and thus dispensed from the apparatus 12 and finally the strip 26 with the labels removed therefrom is wound onto a take-up roll 34. As the labels are intermittently removed from the strip, additional lengths of the strip are wound about this roll.

The take-up roll 34, as seen in FIGS. 3 and 4, comprises two parts, one of these including a hollow hub 36 having an integral flange 38 at one end. The periphery of the hub 36 is a series of flutes 40 parallel to the axis of the roll 34. A rigid shaft 42 is coaxial with the hub 36 and is held internally thereof as hereinafter described. A pinion 44 is fast to an end of the shaft 42, said end protruding axially from the end of the hub 36 which carries the flange 38.

The other part of the take-up roll 34 includes a flange 46 carried by a central sleeve 48 having a through bore 50. The flange 46 mounts a rod 52 which extends inwardly from the flange 46 and parallel to the longitudinal axis of the bore 50. When the two parts of the take-up roll 34 are assembled, the end of the shaft 42 distant from the pinion 44 snugly fits into the bore 50 in the sleeve 48 and the rod 52 lies in any one of the flutes 40. The disposition of the rod 52 in such flute prevents relative rotation of the two take-up roll parts. A central portion 54 of the shaft 42 is of an enlarged diameter, i.e., of a diameter larger than the diameter of the bore 50, and acts as a spacer to keep the flanges 38, 46 a fixed distance apart. A slip clutch 56, later to be described, is located within the hub 36 to drivingly connect the shaft 42 to the take-up roll.

The take-up roll 34 is rotatably mounted on a U-shaped bracket 58. Each leg 60 of the bracket 58 has an open-ended slot 62 at its upper end. The shaft 42 protrudes from both sides of the take-up roll 34, and these shaft protrusions are cradled in the open-ended slots 62. On the pinion side of the take-up roll, the slot 62 is disposed about the shaft 42 between the clutch 56 and the pinion 44.

The lower end of the U-shaped bracket 58 is rigidly joined to the lower end of a front cover or closure member 64. A horizontal pivot rod 66 extends between the side walls 18, 20 and pivots the joined bracket 58 and closure member 64 at their lower ends to the side walls. The bracket 58 and the closure member 64 pivot between an open exposed position as shown in FIG. 2 and a closed operative position as shown in FIG. 1. The closure member 64 is held in its closed position by a knurled-headed screw 68 the tip of which presses against the member 64. An internal stop 69 on the wall 20 (see FIG. 17) is located above an end of the shaft when the bracket 58 is in its inward position. The stop thus prevents the shaft 42 from rising out of the slot 62 due to tension on the strip 26 when the take-up roll 34 is in operative position and the apparatus is used.

Drive means is provided to move the backing strip 26 along its fixed path within the apparatus 12. Said means includes an operating handle 70 mounted on a housing 71 on the supporting structure 14 and adapted to oscillate about a shaft 72 to which is fixed a large diameter driving gear 74. The operating handle 70 has the usual one-directional connection with the shaft 72 so that the handle will rotate the shaft 72 and thus the driving gear 74 only on its downward stroke, the gear 74 thus experiencing intermittent rotation in a counter-clockwise direction as viewed in FIG. 6. An elongated coil spring 76 has one end attached to the supporting structure 14 and the other end attached as by a small screw 78 to a hub 79 movable with the handle 70. Actuation of the operating handle 70 downward tensions this spring so that after the handle is released the spring will urge and move the handle back to its uppermost or idle position. A stop 80 abuts the handle when the handle is approximately horizontal and prevents further upward movement of the handle.

A small diameter check gear 82 is mounted on the supporting structure 14 and meshes with the driving gear 74. The gear 82 is rotatable only in a clockwise direction (as viewed in FIG. 6) and thereby prevents clockwise rotation of the driving gear 74 when the spring 76 returns the handle 70 to its idle position.

The driving gear 74 also meshes with the pinion 44 on the take-up roll 34 when the bracket 58 is in close position, so that rotation of the driving gear will rotate the take-up roll 34 in a clockwise direction (as viewed in FIG. 6), the take-up roll thereby winding the backing strip 26 upon itself and so pulling the strip along its fixed path.

The apparatus 12 further includes means for applying the peeled labels onto any selected one of several predetermined locations on the surface of a document. Said means comprises a flat horizontal shelf 84, suitable for supporting a document onto which pressure sensitive correction labels are to be applied. Said shelf is carried by the front closure member 64. As shown in FIG. 1, the shelf 84 is oblong and has a supporting face greater in the area than the document which it supports, here a check. The shelf 84 may be conveniently joined to the closure member 64 by an angle bracket 86, one leg of which is affixed to the closure member 64 and the other leg of which is affixed to the underside of the shelf 84, as by screws 88.

In order to apply the correction label 24 to any selected one of several predetermined locations on the document, the apparatus includes means to selectively position the document. This means includes two linear stops, each one of which abuts a different one of two adjacent sides of the document, which is usually rectangular. One stop is fixed and is adapted to abut a side of the document which is perependicular to the fixed path of the backing strip 26 over the table 28. This stop comprises the closed ends of two open slots 90, each slot being horizontally disposed in the forward edge of a different one of the upstanding walls 18, 20. The slots 90 are in horizontal registry with the upper surface of the shelf 84 so that a document placed on the shelf 84 may have one of its sides, e.g. a long side, inserted into the slots by a user of the apparatus 12. When a document is so positioned on the shelf 84, i.e. when one of its sides abuts the transversely registered closed ends or bottoms of the slots 90, this side of the document will project under and underlie the horizontal jutting stripping edge 32.

The other stop is movable and is adapted to abut an edge, e.g. a short side, of the document which is parallel to the fixed path of the backing strip 26 across the table 28. This stop includes a slide 92 mounted for movement along the length of the shelf 84. The slide 92 has an edge which is adapted to be abutted by a side of the document, the lateral position of the document on the shelf 84 being determined by the position of this slide on the shelf. To this end, the shelf 84 is provided with an elongated lateral slot 94 extending perpendicularly to the direction of label feed. A headed screw 96 passes through the slide 92 and through the slot 94. A wing nut 98 is threaded on the shaft of the screw 96 and can be tightened so as to fix the slide 92 in any desired position along the slot 94.

Regulating means is provided so that only one label is dispensed on a single downward stroke of the operating handle 70. Such means is necessary since as labels are dispensed, expended backing strip, i.e. backing strip from which labels have been removed, winds up on the take-up roll 34 and the radius of expended material increases, which would otherwise increase the amount of backing strip feed per stroke of the handle 70. To insure a desirable constant feed or advance of the backing strip 26 per handle stroke, the regulating means controls the movement of the backing strip 26 along its fixed path so that only a single label is dispensed from the strip and applied to the document. The regulating means includes a blocking member 100 in the form of a blade mounted for rotation between two upstanding spaced parallel supports 102, 104. The blocking member 100 is rotatable about a horizontal axis above and perpendicular to the fixed path of the strip 26 across the table 28 and has an integral trailing acute edge 106 parallel to this axis and which is movable between a position blocking forward movement of the strip 26 and a position clear of the first named position.

The blocking member 100 has a forward edge opposite and parallel to the trailing edge 106 curled about a shaft 108 and fixedly fastened thereto as by a set screw 110. The shaft 108 is the pivot for the blocking member 100 and is rotatably mounted between the supports 102, 104. The supports 102, 104 are parallel to and are, respectively, joined to the walls 18, 20 at the latter's upper forward edges. An extension 112 of the shaft 108 on the end of the shaft adjacent to the operating handle 70 extends through and is connected external to the support 102 to a linkage. Said linkage biases the shaft 108 and the blocking member 100 connected thereto in a clockwise direction (as shown in FIG. 6) until the acute edge 106 abuts the backing strip 26 and lies in front of the path of travel of a leading edge of a label 24 mounted thereon.

This linkage includes an arm 114 fixedly attached to the shaft extension 112 and extending generally rearwardly therefrom. Rotation of the arm 114 will rotate the shaft 108. A rod 116 depends from the rear end of the arm 114 and rests on the operating handle 70 when the handle is in its idle horizontal position. At this time the linkage holds the acute edge 106 clear of the backing strip 26 above the level of labels thereon. A spring 118 connected on one end to the structure 14 and on the other end to the arm 114 acts thereon so as to urge the blocking member 100 and its acute edge 106 to its lower blocking position.

A pressure plate 120 having a knob 122 mounted thereon rests under its own weight on top of the strip 26 on the table 28 and is utilized to apply light pressure to the backing strip 26 so as to keep the strip in its desired fixed path of movement. A tongue 123 protrudes forwardly from the presser plate, and the acute edge 106 of the blocking member 100 has a cut-out of complementary shape to the tongue to prevent interference between these parts. The rear edge of the presser plate 120 is bent upwardly and may be engaged rearwardly of transverse pins 124, these pins being fixed, in registry, internally of the supports 102, 104.

To aid in keeping the backing strip 26 in its desired fixed path, upstanding pins 126 are disposed one on each side of the fixed path across the table 28 and are mounted on the table. Also to this end, a horizontal roller 128 has an axis of rotation perpendicular to the path and is rotatably mounted between the supports 102, 104. The roller is mounted proximate to the stripping edge 32 and above the table 28, leaving space between it and the table just sufficient for the strip 26 with the labels 24 mounted thereon to pass therebetween.

The regulating means further includes the slip clutch 56 operative between the strip drive means and the take-up roll 34 so that when one label is dispensed from the strip and the blocking member 100 prevents further forward movement of the strip 26, the drive means does not further rotate the take-up roll. With particular reference to FIG. 4, the pinion 44 which meshes with the drive gear 74 is fast to the shaft 42. The shaft 42 turns two driving clutch plates. The first of these is a disc 130 fixed on the shaft 42 as by a deeply inset set screw 132. The second clutch plate is a two part member: the first part is a disc 134 fixedly attached as by another deeply inset set screw 136 to the shaft 42; the second part is a matching disc 138 slidably axially along the shaft 42. The disc 134 carries a rod 140 which is parallel to the axis of the shaft 42 and which slidably engages an aperture 142 in the second disc 138. Thus, the disc 138 is slidable axially along the shaft 42 and is locked to the disc 134 for simultaneous rotation therewith by means of the rod 140.

A driven clutch plate 144 is fixedly attached to the hub 36 as by a set screw 146 and is disposed about the shaft 42 and between the driving clutch plates. Friction washers 149 act as bearing surfaces and separate each face of the driven clutch plate 144 from its affiliated clutch driving plate 130, 138. A helical spring 148 encircles the shaft 42 between the two discs 134, 138. The spring 148 is loaded under compression, and its expansive force urges the disc 138 away from the disc 134 and into frictional engagement through the washer 149 with the driven clutch plate 144. The spring 148 also urges the disc 130 through the disc 134 and the shaft 42 into frictional engagement through another washer 149 with the driven clutch plate 144. The frictional force between the driving and driven clutch plates may be conveniently varied by increasing or decreasing the compression on the spring 148 by shifting the disc 134 respectively toward or away from the disc 130 through use of the set screw 136. Increasing such compression increases the frictional coupling within the slip clutch 56, the converse also being true. An increase in the frictional force will necessitate a greater drive force on the pinion 44, when the strip 26 is blocked, to cause the clutch 56 to slip.

A press 150 is provided to urge a single label 24 dispensed from the backing strip 26 and laying on any selected one of the predetermined locations on the document into firm adherent contact therewith. The press 150 is movable between a position urging the label into such adherent contact and a position clear of the first-named position. The press 150 includes a U-shaped bracket 152 rotatably mounted between the supports 102, 104 and about an axis perpendicular to the fixed path of the strip 24 across the table 28, said bracket for this purpose having each of its rearwardly extending legs rotatably secured to a different one of the supports 102, 104 by pivot pins 154. The crossbar of the U-shaped bracket 152 carries a press head 156 which is affixed thereto as by screws 158 and which depends downwardly from the bracket 152. Secured to the bottom edge of the press head 156 is a press face 160. Preferably the face 160 is made of a resilient-yet-firm material, e.g. a soft or foam rubber so that the face can evenly distribute force applied by the press head 156 to the label on the document over the entire label surface.

A mechanical linkage connects the press 150 to the operating handle 70 so that after one label has been dispensed from the backing strip 26 onto the document, the end of the downward stroke of operating handle 70 actuates the press 150. This linkage includes a downwardly depending arm 162 joined to one leg of the U-shaped bracket 152 by a pivot pin 164. The arm 162 hangs external to the support 102 and carries at its lower end a horizontally protruding rod 166. A spring 168 connected on one end to the supporting structure 14 through a screw 170 and on the other end to the arm 162 at the rod 166 urges the arm 162 and thus the press 150 into its uppermost or idle position.

The rod 166 is so disposed on the arm 162 that near the end of its operating stroke, the operating handle 70 contacts the rod 166 and carries it downwardly, thereby moving the press downwardly and in front of the stripping edge 32 until the resilient face 160 of the press 150 abuts and urges the peeled label 24 into firm contact with the document surface. A notch 172 in the support 102 prevents interference between the support 102 and the pin 164 when the pin moves downwardly with the press 150.

FIG. 14 shows a document D of the type to which labels are applied. The illustrated document is a check oblong in shape and having three locations 174a, 174b and 174c onto which magnetic characters are imprinted for use with a MICR system. It will be noted that the locations are each of an equidistant normal distance from one edge 176, e.g. the long edge, of the document but are varying distances from an adjacent edge 178 e.g. the short edge, of the document. Of course, all the locations are approximately similarly placed on documents used within one system.

FIG. 15 shows a pressure sensitive correction label 24 applied to one desired location 174b on the document. The label 24 is of the usual magnetically impermeable material to prevent a scanning device from reading the magnetic ink characters beneath the label. A corrected set of magnetic characters may be imprinted on the applied label, once the same is applied to the document.

The apparatus 12 is loaded as shown in FIGS. 1, 2 and 6 so that the backing strip 26 runs along a fixed path from the supply roll 22 across the table 28 through a sharp reverse bend over the stripping edge 32 and around the take-up roll 34.

The take-up roll 34 is conveniently exposed for loading and expended strip removal by releasing the screw 68 and pivoting the closure member 64 forward, thereby rocking the bracket 58 carrying the take-up roll 34 outwardly from between the front ends of the walls 18, 20. One end of the backing strip 26 may be slipped between the rod 52 and the hub 36 to frictionally secure the strip to the roll. The two parts of the take-up roll 34 may be taken apart to quickly remove expended strip therefrom.

A cycle of operation of the instant apparatus includes placing the document on the support shelf; positioning the document against the stops associated with the shelf so that the label when dispensed falls freely onto the desired location; dispensing the label from the backing strip onto this location; urging the pressure sensitive face of the label into firm adherent contact with the document; and placing the apparatus in a posture preparatory for the next cycle.

FIGS. 9–13 shows various successive steps in the cycle of operation. FIG. 9 shows the document in place on the support shelf 84 and the foremost label at the beginning of a cycle. At such time the leading edge of this label is just in back of the stripping edge 32. The backing strip 26 with labels thereon is supported by the table 28 and then passes over the stripping edge 32 experiencing a sharp downward and reverse bend. The backing strip (with the labels removed therefrom) then leads to the take-up roll 34. FIGS. 10 and 11 show a label partially and then wholly freed from the backing strip. The stiffness of the label and the high release characteristic of the strip make the label adaptable to be readily peeled away from the strip when the strip is sharply bent away from the label over the small, e.g. 0.01″, radius of the stripping edge 32. With the document underlying the jutting stripping edge, each label will fall freely onto the selected predetermined situs on the document.

FIG. 12 shows the press face 160 urging the label into contact with the document surface. FIG. 13 shows the label fixed onto the document surface and the backing strip 26 with labels thereon in position preparatory for the next cycle of operation.

The cycle of operation is effectuated by the user of the apparatus by depressing and then releasing the operating handle 70. In its idle position, the handle 70 supports the rod 116 which keeps the blocking member 100 clear of the strip 26, the spring 76 being stronger than the spring 118. The press 150 is held in an idle position by the action of the spring 168 urging the arm 162 upward thereby holding the press 150 upward and away from the support shelf 84. FIGS. 5 and 6 show the apparatus in this idle position. At this time the leading edge of the next label 24 to be dispensed is just rearward of the stripping edge 32.

As the handle 70 is pressed downwardly as by the hand of the user, the driving gear 74 connected to the handle 70 drives the pinion 44 and thus the take-up roll 34. As the take-up roll rotates in a clockwise direction (as shown in FIG. 6), it draws the backing strip 26 through its fixed path and around the take-up roll. Depression of the handle 70 also allows the rod 116 to be moved downwardly by the spring 118, thereby rotating the blocking member 100 with its acute edge 106 onto the top surface of the label 24 mounted on the backing strip 24, which label had been directly blocked by the edge 106 in the last previous cycle of operation. As the strip continues to move forward, the top of this label slides under the edge 106 as shown in FIG. 7 until the label has passed by the edge. Thereupon the edge 106, due to the urging of the spring 118, drops onto the portion of the strip in front of the next label. When the edge has so dropped, it rests on the backing strip below the top of the leading edge of the next label. As the strip continues to move forward, the strip slides under the edge 106 until the leading edge of the next label abuts the acute edge 106. This position of the edge 106 in front of and blocking the next label is shown in FIG. 8. The blocking member 100 thus allows one label 24 to pass by it during each cycle of operation. Hence, in each cycle of operation, the backing strip advances a distance equivalent to the distance from the leading edge of one label to the leading edge of the next label. The shear resistance of the label acting on the strip 26 and thus on the take-up roll 34 causes the clutch 56 to permit slippage between the still-driven pinion 44 and the take-up roll 34, so that further rotation of the pinion 44 by the end travel of the handle 70 will not tear or damage the strip or dislodge labels therefrom. The clutch slips between the clutch driving plates 130, 138 secured to the shaft 42, the friction washers 149 and the driven plate 144 secured to the hub 36 of the take-up roll 34 to which the strip is attached.

Forward movement of the backing strip and movement of a label bearing portion of the strip 26 through the reverse sharp bend of the fixed path dispenses a label 24 from the backing strip 26 and the label then falls onto its desired location on the document surface. Towards the end of its downward stroke, the handle 70 contacts the rod 166 and moves the rod and the arm 162 connected thereto downwardly, thereby moving the press 150 so that the press face 160 abuts and then urges the label with its pressure-sensitive face into firm contact with the document. Release of the handle 70 allows the apparatus to return to its idle position preparatory to the next cycle of operation, the blocking member being raised to its position clear of the labels.

The acute edge 106, while blocking forward movement of the backing strip 26, may tend to intrude to a small extent under the leading edge of the label it is blocking. The adhesive of the label then adheres to the blocking member and prevents its upward movement, thus halting further dispensing of labels. The centrally located forwardly extending tongue 123 of the presser plate 120 overlies a central portion only of the blocked label and restrain the foregoing tendency.

The space between the long edge 176 of the document and the situs of application of a label is fixed, being determined by the depth of the slots 90 and their relationship to the stripping edge. The space between the short edge 178 of the document and the situs of application of a label is adjustable and is determined by this setting of the slide 92.

It thus will be seen that I have provided an apparatus which achieves the several objects of my invention, and which is well adapted to meet the conditions of practical use.

As various possible embodiments might be made of the above invention, and as various changes might be made in the embodiment set forth above, it is to be understood that all matter herein described or shown in the accompanying drawings is to be interpreted as illustrative and not in a limiting sense.

Having thus described my invention, I claim as new and desire to secure by Letters Patent:

1. An apparatus for first dispensing and then applying an oblong pressure sensitive label selectively to any one of several predetermined locations wholly within the boundary of an upwardly facing indicia-bearing exposed upper surface of a horizontally disposed stationary oblong sheet document during a cycle of operation, each dimension of the document being greater than a parallel corresponding dimension of the label, said apparatus comprising:
   a backing strip upon which the oblong labels are mounted seriatim, each of said labels having a pressure sensitive face adherent to the backing strip and being adapted to be peeled away from said strip,
   a supply roll,
   a take-up roll,
   a horizontal linear jutting stripping edge, said backing strip following a fixed path from said supply roll to said take-up roll including a sharp reverse bend over said stripping edge,
   drive means moving said backing strip along the fixed paths and through the bend so as to dispense the labels from the strip and so that each label after being dispensed falls freely through a short substantially vertical path to a predetermined situs,
   a flat horizontal shelf secured to the apparatus and adapted to support the document close to and below the stripping edge,
   means to position the document on the shelf with an edge boundary of the document substantially parallel to the stripping edge and with some portion of the document in vertical free fall alignment with said stripping edge, and so that any predetermined selected one of the several locations on the exposed upper surface of the document is coincident with the predetermined situs, and
   regulating means dispensing only one label from the backing strip during a cycle of operation.

2. Label applying means as set forth in claim 1 wherein the positioning means includes stops abutting two adjacent sides of the document.

3. Label applying means as set forth in claim 2 wherein one stop is linear and fixed and abuts a side of the document which is perpendicular to the fixed path of the backing strip and the other stop is selectively movable and abuts a side of the document parallel to the fixed path of the backing strip.

4. For use with a label dispenser for dispensing pressure sensitive labels from a backing strip upon which the labels are mounted seriatim, said labels having a pressure sensitive face adherent to the backing strip and being adapted to be peeled away from said strip, said backing strip being moved by drive means through a fixed path from a supply roll to a take-up roll, said path including a sharp reverse bend over a horizontal jutting stripping edge whereby said labels are dispensed from said strip and thereafter freely fall through a substantially vertical path, means for applying each pressure sensitive label selectively to any one of several predetermined locations on an exposed upper surface of a horizontally disposed stationary document during a cycle of operation, said means comprising:
   a flat horizontal shelf secured to the dispenser and adapted to support the document,
   means to position the document on the shelf so that the dispensed labels fall onto any predetermined selected one of the several locations on the exposed surface of the document, and
   regulating means dispensing only one label from the backing strip during a cycle of operation, said regulating means including a blocking member movable between a position in front of and blocking a label mounted on the backing strip and a position clear of the first mentioned position, said blocking member assuming the first mentioned position so as to allow only one label to be dispensed in a cycle of operation.

5. Label applying means as set forth in claim 4 wherein the regulating means includes a clutch, said clutch disengaging the drive means from the backing strip when the blocking member assumes its first-mentioned position after one label has been dispensed during a cycle of operation.

6. Label applying means as set forth in claim 5 wherein the clutch is a slip clutch, said clutch having a driving plate operatively connected to the drive means and a driven plate operatively connected to the take-up roll, said plates being in frictional engagement and slipping when the blocking member blocks a label and prevents further movement of the backing strip.

7. Label applying means as set forth in claim 5 wherein the drive means pulls the backing strip by winding the strip on the take-up roll, said clutch disengaging the drive means from the take-up roll after one label has been dispensed during a cycle of operation.

8. Label applying means as set forth in claim 4 wherein a weight is provided to rest on a portion only of the leading edge of the blocked label to restrain intrusion of the blocking member thereunder.

9. Label applying means as set forth in claim 4 further including guide means preventing lateral movement of the backing strip along its fixed path, said guide means including upstanding pins mounted on the dispenser on each side of said fixed path.

10. For use with a label dispenser for dispensing pressure sensitive labels from a backing strip upon which the labels are mounted seriatim, said labels having a pressure sensitive face adherent to the backing strip and being adapted to be peeled away from said strip, said backing strip being moved by drive means through a fixed path from a supply roll to a take-up roll, said path including a sharp reverse bend over a horizontal jutting stripping edge whereby said labels are dispensed from said strip to a predetermined situs, means for applying each pressure sensitive label selectively to any one of several predetermined locations on an exposed upper surface of a horizontally disposed stationary document during a cycle of operation, said means comprising:

a flat horizontal shelf secured to the dispenser and adapted to support the document, means to position the document on the shelf so that any predetermined selected one of the several locations on the exposed surface of the document is coincident with the predetermined situs, a press mounted for movement between a position juxtaposed against the one of several locations on the exposed surface of a document to which the label has been applied and a position free of said first mentioned position, said press when in said first mentioned position urging the dispensed label into firm adherent contact with said surface, and regulating means dispensing only one label from the backing strip during a cycle of operation.

11. An apparatus for first dispensing and then applying an oblong pressure sensitive label selectively to any one of several predetermined locations wholly within the boundary of an upwardly facing indicia-bearing exposed upper surface of a horizontally disposed stationary oblong sheet document during a cycle of operation, each dimension of the document being greater than a parallel corresponding dimension of the label, said apparatus comprsing:

a backing strip upon which the oblong labels are mounted seriatim, each of said labels having a pressure sensitive face adherent to the backing strip and being adapted to be peeled away from said strip, a supply roll, a take-up roll, a horizontal linear jutting stripping edge, said backing strip following a fixed path from said supply roll to said take-up roll including a sharp reverse bend over said stripping edge, drive means moving said backing strip along the fixed path and through the bend so as to dispense the labels from the strip and so that each label after being dispensed falls freely through a short substantially vertical path to a predetermined situs, a flat horizontal shelf secured to the apparatus and adapted to support the document close to and below the stripping edge, and means to position the document on the shelf with an edge boundary of the document substantially parallel to the stripping edge and with some portion of the document in vertical free fall alignment with said stripping edge, and so that any predetermined selected one of the several locations on the exposed upper surface of the document is coincident with the predetermined situs.

References Cited by the Examiner
UNITED STATES PATENTS

| | | | |
|---|---|---|---|
| 3,093,528 | 6/1963 | Reich | 156—584 |
| 3,128,219 | 4/1964 | Cummings | 156—584 |
| 3,169,895 | 2/1965 | Sohn | 156—584 |

EARL M. BERGERT, *Primary Examiner.*

DOUGLAS J. DRUMMOND, *Examiner.*